April 7, 1942.  H. M. SENSENICH  2,278,900
AIRPLANE PROPELLER
Filed June 29, 1939
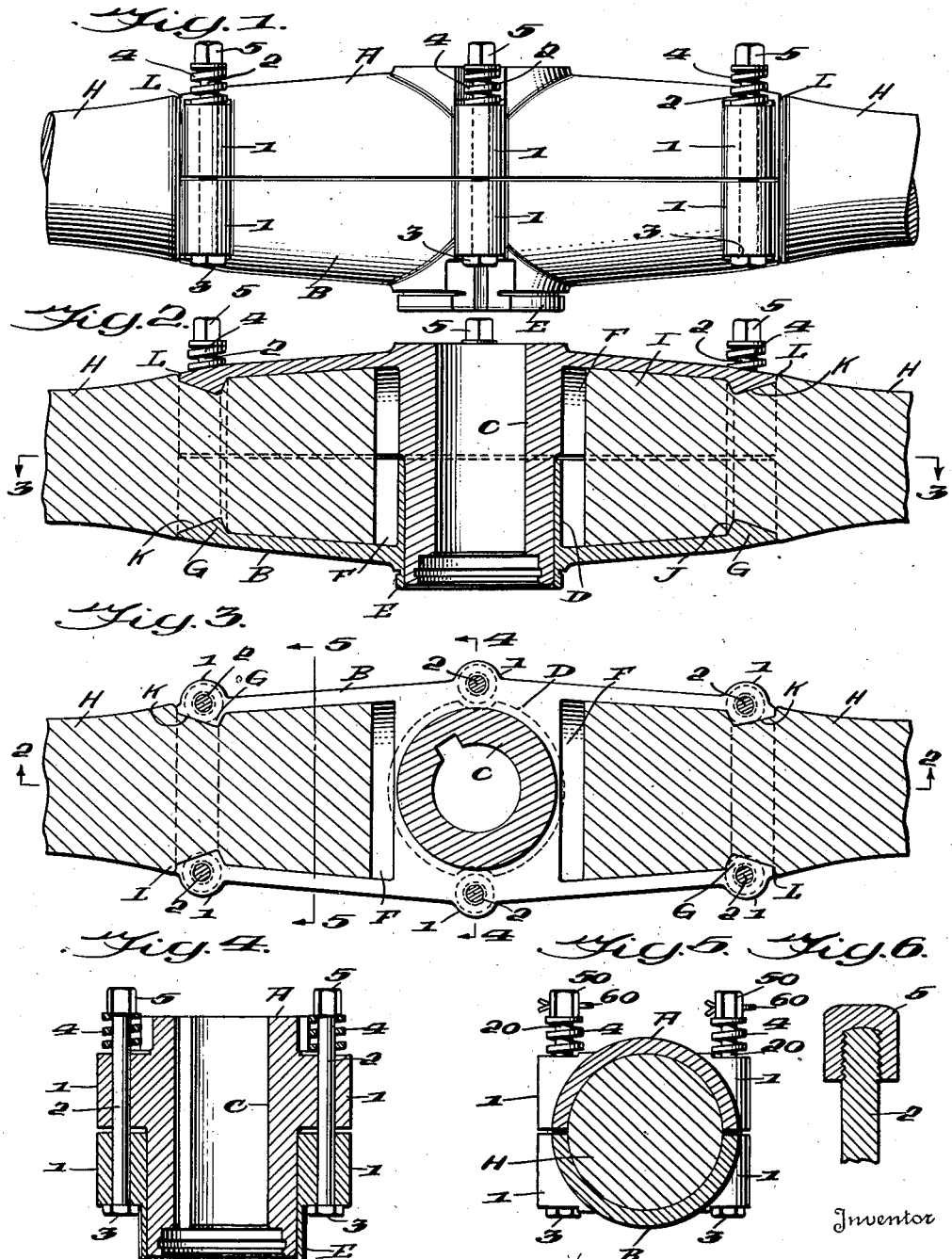
Inventor
Harry M. Sensenich
By Richard E. Babcock
Attorney

Patented Apr. 7, 1942

2,278,900

UNITED STATES PATENT OFFICE 2,278,900

AIRPLANE PROPELLER

Harry M. Sensenich, Lititz, Pa., assignor to Sensenich Brothers, near Lititz, Pa., a copartnership composed of himself and Martin M. Sensenich Application June 29, 1939, Serial No. 281,959

2 Claims. (Cl. 170—173)

This invention relates to automatic moisture compensating airplane propellers, or to propellers of which the primary field of use will be in connection with airplanes, although such propellers may also be used as air pushers on sleds or boats or simply as air impellers or fans.

The invention is concerned primarily with propellers having metal hubs and wood blades or blades having wood roots clamped in any selected angular position by the hub, though it also will function to advantage in a propeller having a hub of one material and blade roots clamped and held in operative position by said hub and of a material differing from said hub and expanding and contracting at a different rate or to a different degree than, or out of harmony with, the material of the hub under some operative conditions, such as changes in atmospheric moisture or changes in temperature.

The conditions primarily in mind however are varying moisture or humidity and the related materials primarily in mind are metal for the hub and wood for the blade roots.

Heretofore it has been found that when propellers having metal hubs and individual wooden blades or blades having wooden roots have been used and the roots have been set at a selected angular position and the hub has been tightened up to hold the blades in such selected angular position, the blades would become loose or would shift in position due to change in absorption of moisture by the roots, or escape of moisture from the roots, incident to changes in atmospheric conditions, the absorption of moisture resulting in expansion of the roots and the loss of moisture resulting in contraction of the roots.

Due to the variations in atmospheric moisture content conditions either at a given airport or at the start and finish of a given flight it has been usual practice, in the case of metal hub wooden blade variable pitch propellers, for the maintenance mechanics to test the hubs on the propellers after each flight, to guard against their coming loose in their sockets and turning out of proper angular position.

Various efforts have been made to meet this difficulty by heavily coating the roots with varnish or by otherwise treating them in an effort to render them moisture-proof or by highly compressing them or otherwise processing them with the same purpose in view.

Such processing or treatment has been highly expensive and has not been entirely satisfactory in that the treatment could not be relied upon as entirely one-hundred per-cent perfect and even where the processing or treatment was perfect originally, the roots in handling would sometimes become injured, as by having a coating broken through, with the result that moisture would work its way into the root with the objections above noted, but even where they were not injured and where the processing was one-hundred per cent efficient, nevertheless the expense inherent in such processing or treatment was and is a serious consideration and to be avoided if possible.

The present invention has been made with the foregoing considerations in mind and has for its primary objects the combining of the metal hub with the wooden propeller blade roots and the fastening means for the metal hub parts in such manner as to permit blades with roots to be mounted between the members of the hub, which are so related as to permit a yielding between the hub members as the blade roots absorb moisture and to force the hub members toward each other as the blade roots yield up moisture and which serve at all times to clamp between the hub members the roots of the blades with such a high degree of frictional grip or clamping action as to firmly and positively hold the blades against relative angular movements with relation to the hub sockets.

While the invention is primarily intended for embodiment in airplane propeller blades it may of course be embodied in any metal hub wooden blade propeller regardless of the use to which such propeller is put, whether it be used to propel a sled or a boat or an airplane or other device, or whether it just be used to impel air or gas.

In this application I show and describe only the preferred embodiment of my invention simply by way of illustration of the practice thereof as by law required. However, I realize that my invention is capable of other and different embodiments, and that the various details thereof may be modified in various ways, all without departing from my said invention. Therefore the drawing and description herein are to be considered as merely illustrative and not as exclusive.

In the accompanying drawing:

Figure 1 represents a side elevation of the hub and adjacent portions of the blades of an airplane propeller embodying my invention;

Figure 2 represents a sectional view on the line 2—2 of Figure 3, looking in the direction of the arrows;

Figure 3, a sectional view on the line 3—3 of Figure 2, looking in the direction of the arrows;

Figure 4, a sectional view on the line 4—4 of Figure 3, looking in the direction of the arrows;

Figure 5, a sectional view taken on a line corresponding to 5—5 of Figure 3, and illustrating a slightly modified form; and, Figure 6, a detail fragmentary sectional view of an end portion of one of the bolts 2 with its corresponding nut 5 applied thereto in operative relation.

Referring now in detail to the drawing, A represents the rear plate or member of the hub having a propeller shaft receiving sleeve C, and B represents the front plate or member of the hub having an internal bushing or sleeve D fitting about the reduced forward portion of the sleeve C and being formed with a forward external flange E which may be slotted or grooved as shown to receive the lip of a finishing cap, not shown.

In the embodiment of the invention illustrated a two blade propeller construction is shown, the plates or members A and B being internally formed or cavitied to between them form conical recesses or sockets F disposed on opposite sides of the sleeve C.

The outer ends of said conical sockets F terminate in sharp abrupt radially inwardly and slightly forwardly inclined shoulders or faces intersected by the radially outwardly and more gently tapering faces of the mouth of the socket, all as formed by the thickened outer end portions G of said plates A and B.

Each wooden blade H will be formed in accordance with present well known practices and will preferably be of laminated wood structure. Each said blade H will be formed with a conical root portion I having an abrupt outwardly presented abruptly radially inwardly extending slightly outwardly endwise inclined shoulder J corresponding in form and inclination to the abrupt end shoulder of the respective hub sockets. Preferably extending from the inner end of said shoulder J is a radially outwardly inclined annular face K corresponding in angle of inclination to the inclined face of the mouth of the socket and extending endwise outwardly for the length of said mouth faces in the direction of the respective blades H. Shoulders L may be arranged at the axially outer end portions of the faces K to overlie the extreme end portions of the hub or so that the adjacent shank portions of the blades H will lie substantially flush with the external faces of the plates A and B of the hub and will result in giving a substantially smooth finished appearance to the construction. However, the shoulders L are not essential and may be dispensed with.

The rearwardly inclined conical faces K in opposition to the peripheral faces of the conical roots I and the shoulders J will serve to maintain the roots I in proper position in the respective sockets F in the direction of the axis thereof.

The hub members A and B are formed at preferably equidistant marginal edge portions with bored shoulders or lateral enlargements I arranged in registering pairs to receive clamping bolts 2. The bolts 2 are threaded through their respective pairs of shoulders or enlargements I until the respective heads 3 of the bolts 2 engage the forward faces of their respective shoulders or enlargements I of forward plate or member B, and the rear ends of the bolts 2 project beyond the rear faces of the shoulders I of the rear plate or member A. Thereafter a strong helical spring 4 is placed on the end of each bolt 2 to bear with its forward end against the rear face of the corresponding shoulder I of the plate A and finally a nut 5 is applied to the screw- threaded end of each bolt 2 and is turned up tight until the interior wall of its closed end portion engages the end of the bolt 2 and prevents further turning movement between said parts.

The strength of the springs 4, the external diameter of the roots I, the size of the sockets F, and the length of the nuts 5 and the bolts 2 are so related and calculated that when the nuts 5 are turned up tight on the ends of the bolts 2 to their operative position with their end walls in engagement with the tip ends of the bolts 2 the springs 4 will be put under heavy compression, drawing the member B through the intermediary of the bolts 2 toward the member A and forcing the member A toward the member B, resulting in firmly clamping frictionally the roots I between the members A and B and by such frictional clamping grip maintaining the roots I in any angular position of adjustment to which they may have been set, the compression of the springs 4 being such as to maintain such frictional clamping grip on the roots I as the same may shrink and decrease in size due to loss of moisture, right up to the point where the opposing side edges of the members A and B touch or substantially touch each other, the compression action or load of the springs still being maintained on said clamping members A and B. Up to that point the external annular shoulder of the sleeve C and the rear opposing end edge of the sleeve D will remain out of contact and so will not interfere with the operation of the clamping action of the clamping members A and B throughout their operating range.

The number of helices of each of the springs 4 and the cross-sectional size of each helice of each said spring 4, and the length of the corresponding bolt 2 and the pair of shoulders I through which said bolt 2 is threaded, and the length of the nut 5 screwed onto the end of the bolt 2, are all so calculated and related that when the nut 5 is turned up to its final operative position the distance between the rear face of the corresponding shoulder I of member A and the opposed forward face of the skirt of the nut 5 will exceed in length the total length of the cross-sections of all of the helices of said helical spring 4, so that in no case would it be possible to turn up the nut 5 on the bolt 2 to such degree as to eliminate all possibility of compensatory action of the spring 4, regardless of the degree of shrinkage of the roots I. Preferably the cross-sectional size of the helices of the springs 4 and the number of helices of each of the springs 4 and the cooperating parts will be so related that in the average operative conditions the opposing edge faces of the members A and B and the opposing faces of the external shoulder of sleeve C and the end of sleeve D will be spaced apart approximately three sixty-fourths of an inch in the case of a small size propeller using blades roots three inches in diameter at their largest portion and the helices of the springs will have the parallel faces of their adjacent helices spaced apart by approximately one-sixteenth of an inch so that as the roots I absorb moisture the plates or members A and B may spread apart against the opposition of the springs 4 to accommodate the increase in the diameter of the roots I until such a point has been reached that the final degree of compression of the springs 4 has been reached with their helices in contact and so that as the moisture escapes from said roots I due to dry atmosphere and said roots I decrease in diameter the members A and B may move toward each other to maintain their clamping operation on the roots I up to the point where the side edges of the members A and B touch each other.

From the foregoing it will be apparent that the springs 4 are relied upon to automatically compensate for variations in diameter of the roots I due to variations in humidity or moisture content of the air and of the moisture content of the roots I, and that due to such automatic compensation by the spring 4 the need for frequent adjustment of the clamping action of the members A and B of the hub is entirely dispensed with, and also the need for special treatment, or varnishing or processing or compressing of the roots I is entirely eliminated.

In the modification shown in Figure 5 the construction and operation are the same as in the preferred form except that instead of the bolts 2, bolts 20 having transverse bores or locking pin holes are used and nuts 50 turned back on the bolts 20 in exactly the same way as in the preferred form with their end walls in contact with the tip ends of the bolts 20. The nuts 50 have holes in their walls, or the walls of their skirts, registering with the transverse bores or pin holes in their corresponding bolts 20, and cotter pins 60 are inserted through the registering holes in the bolts 20 and corresponding nuts 50.

It is thought that such locking cotter pins 60 as are illustrated in the modified form shown in Figure 5 are not necessary and that the nuts 5 in engaging against the ends of the bolts 2 and being thereafter jammed or turned up tight will sufficiently lock themselves onto the bolts 2 to prevent any possibility of coming loose unintentionally or accidentally, but if it be preferred to make doubly sure then the modified form shown in Figure 5 and employing the cotter pins 60 may be used.

It is not essential however that screw-threaded bolts such as 2 receiving nuts such as 5 be employed as the means for securing the members A and B together but instead simply headed smooth rods of the length and diameter of bolts 2 may be used, and may receive thick washers or sleeves on their rear ends to bear with their forward faces against the rear ends of the springs 4 and may have their extreme rear ends spread or riveted over, resulting in a permanent fastening, or any other suitable means serving the desired function may be used. However, the bolt and nut construction, substantially as shown, is preferred as being simple, efficient, and not so apt to harbor defects of crystallization as in an upset end or riveted over construction.

Also, the shoulder J and the end internal enlargement G are not essential and may be omitted.

Also, as stated, while the blades and their roots will preferably be of wood, it is not essential that they be of wood so long as they be of a different material than the hub members and have a different coefficient of expansion under any operative conditions, either as to moisture or temperature.

I claim:

1. A metal-hub variable-pitch wooden-blade propeller comprising a centrally divided two-member clamp-type metal-hub of which the members are slightly spaced apart throughout their length and are internally conically cavitied to together provide a plurality of blade root sockets disposed equidistantly about the axis of said hub and extending radially with relation to said axis, and a plurality of propeller blades having conical wooden roots respectively disposed in said sockets, in combination with headed bolts passing through the marginal portions of said members, and having screw-threaded end portions, nuts respectively screwed on the screw-threaded end portions of said bolts respectively, and strong helical springs respectively disposed about the respective bolts and compressed between the opposing faces of the corresponding nuts and the adjacent hub member, said nuts having imperforate walls extending across their bores and as applied to the respective bolts engaging the respective tip ends thereof to definitely fix the operative position of the respective nuts on the respective bolts and by jam action serving to lock said nuts on their cooperating bolts, said hub members and said blades having cooperating annular portions inclined reverse to the inclination of the taper of the coned roots and sockets and cooperating with said coned portions or roots to maintain the respective blades in proper position radially of said hub.

2. A propeller comprising a divided two-member clamp-type hub of which the members are slightly spaced apart throughout their length and are internally conically cavitied to together provide a plurality of blade root sockets disposed equidistantly about the axis of said hub and extending radially with relation to said axis, and a plurality of propeller blades having conical roots respectively disposed in said sockets, and of material differing from that of said hub and expanding and contracting responsive to changes in the atmosphere out of harmony with the material of said hub, in combination with headed rods passing through the marginal portions of said hub members, laterally projecting members carried by the end portions of said rods respectively, and springs respectively compressed between the opposing faces of said respective members and the adjacent hub member whereby said hub members will respectively be acted upon by the respective heads of said rods and the respective laterally projecting members carried by the respective rods through the intermediary of the respective springs to be automatically adjusted in position to grip and hold between them said blade roots against pitch displacement or substantial endwise movement throughout the operative range of expansion and contraction of said roots, and said hub members and said blades having cooperating axially presented annular faces extending radially inwardly of the respective roots and at an angle to said coned faces of said roots and sockets and cooperating with the coned faces of said sockets and roots respectively to maintain the respective blades in proper position radially of said hub.

HARRY M. SENSENICH.